(12) United States Patent
Liao et al.

(10) Patent No.: US 7,218,509 B2
(45) Date of Patent: May 15, 2007

(54) HANDSET SLIDING STRUCTURE

(75) Inventors: Chia-Wei Liao, Gueishan Township, Taoyuan County (TW); Cheng-Sung Li, Gueishan Township, Taoyuan County (TW); Li-Sen Chen, Gueishan Township, Taoyuan County (TW)

(73) Assignee: Speed Tech Corp., Taoyuan County (TW)

( * ) Notice: Subject to any disclaimer, the term of this patent is extended or adjusted under 35 U.S.C. 154(b) by 402 days.

(21) Appl. No.: 10/956,060

(22) Filed: Oct. 4, 2004

(65) Prior Publication Data

US 2006/0072285 A1    Apr. 6, 2006

(51) Int. Cl.
*H05K 5/00*    (2006.01)
(52) U.S. Cl. ...................................... 361/679
(58) Field of Classification Search ................ 361/679, 361/683
See application file for complete search history.

(56) References Cited

U.S. PATENT DOCUMENTS 6,947,778 B2 *   9/2005   Tsai ......................... 455/575.4
2003/0124991 A1 *   7/2003   Kiuchi et al. ................. 455/90

* cited by examiner

*Primary Examiner*—Yean-Hsi Chang
(74) *Attorney, Agent, or Firm*—Troxell Law Office, PLLC

(57) ABSTRACT

The present invention provides a handset sliding structure for mobile devices comprising a cover, a base and a slider. Therein, a surface of the base comprises two opposing sliding tracks having a narrow section, the shortest distance between them. The cover is slid on the base along the sliding tracks with a slider in between. The slider comprises an elastic member and two ends abutting against the two opposing sliding tracks. Sliding the cover, it can be automatically moved to a predestined end position for opening or closing.

8 Claims, 19 Drawing Sheets

HANDSET SLIDING STRUCTURE

FIELD OF THE INVENTION

The present invention relates to a sliding structure; more particularly, relates to drive the handset to an opening end and a closing end.

DESCRIPTION OF THE PRIOR ART

The prior mobile handset with sliding structure disclosed in U.S. Patent No. 2004/0085739 A1, as shown in FIG. 13, comprises a main body 101, a sub body 102 and a spring module 150. Therein, the spring module 150 comprises a front cover 151, a rear cover 153 and torsion springs 155 disposed between the front cover 151 and the rear cover 153. A pair of sliding guides 127 are disposed on the sub body 102 for the rear cover 153 of the spring module 150 so that the sub body 102 can be slid to the opening end and the closing end on the main body 101 by the spring module 150 and the sub body 102 can move along the sliding guides 127.

Although, by the above-said structure, the main body 101 and the sub body 102 can be pushed or pulled by the spring module 150 and the sub body 102 can move along the sliding guides 127, the spring module 150 is not reliable for the torsion springs 155 of the spring module 150 are not efficient to restore the energy stored by deformation. An end user has to further push or pull he main body 101 or the sub body 102 more to the predestined position. Accordingly, the prior art is not convenient and has to be redesigned.

BRIEF SUMMARY OF THE INVENTION

The first object of the present invention is to provide a sliding structure for mobile devices, which efficiently slide the main body or the sub body to predetermined positions.

To achieve the above-mentioned object, the present invention discloses a handset sliding structure, which comprises a cover, a base and a slider. The cover is designated to slide along the base. The base comprises two opposing sliding tracks each having a continuous curved surface toward each other; and a narrow section is formed between the two sliding tracks. The narrow section is the area, which has the shortest distance between the two sliding tracks. The slider deposited on the cover comprises at least an elastic member, which is adapted to slide between the two sliding tracks. Thereby, the handset can be automatically slid to a predestined position for opening or closing.

BRIEF DESCRIPTION OF THE DRAWINGS

The present invention will be better understood from the following detailed description of preferred embodiments according to the present invention, taken in conjunction with the accompanying drawings, in which.

DESCRIPTION OF THE PREFERRED EMBODIMENTS

The following descriptions of the preferred embodiments are provided to understand the features and the structures of the present invention.

Figure 1:
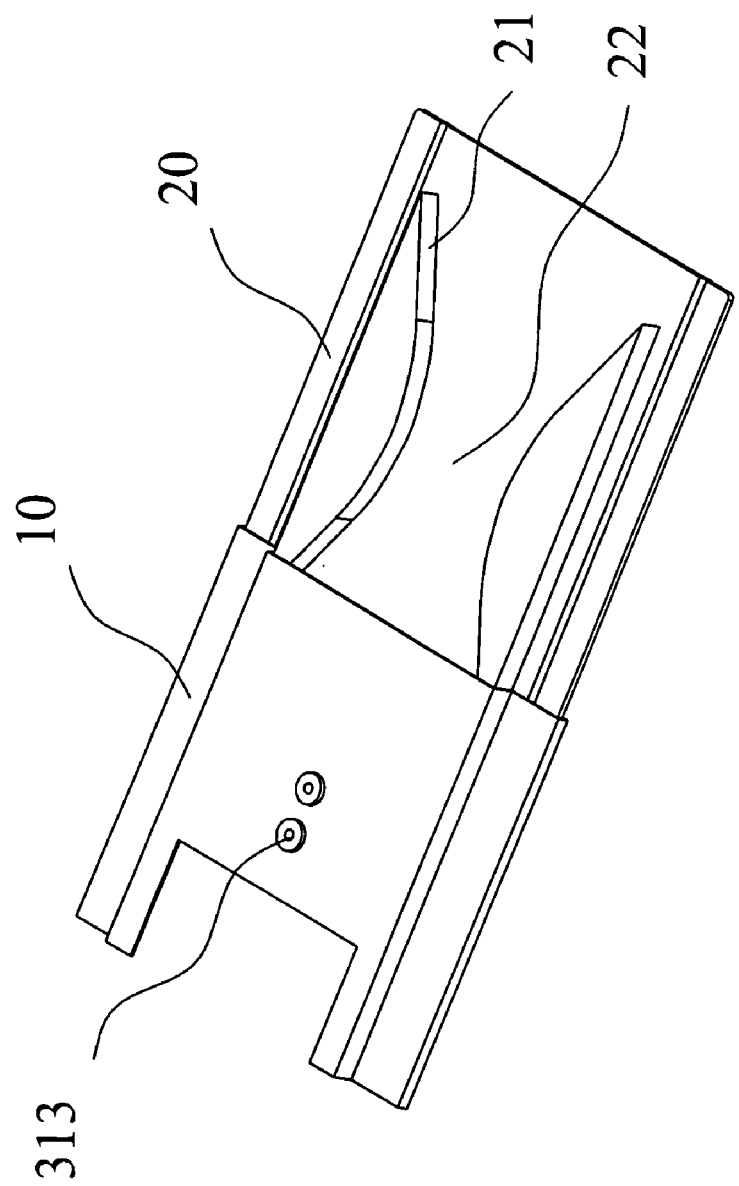
FIG. 1 is a perspective view of the first preferred embodiment according to the present invention.
Figure 2:
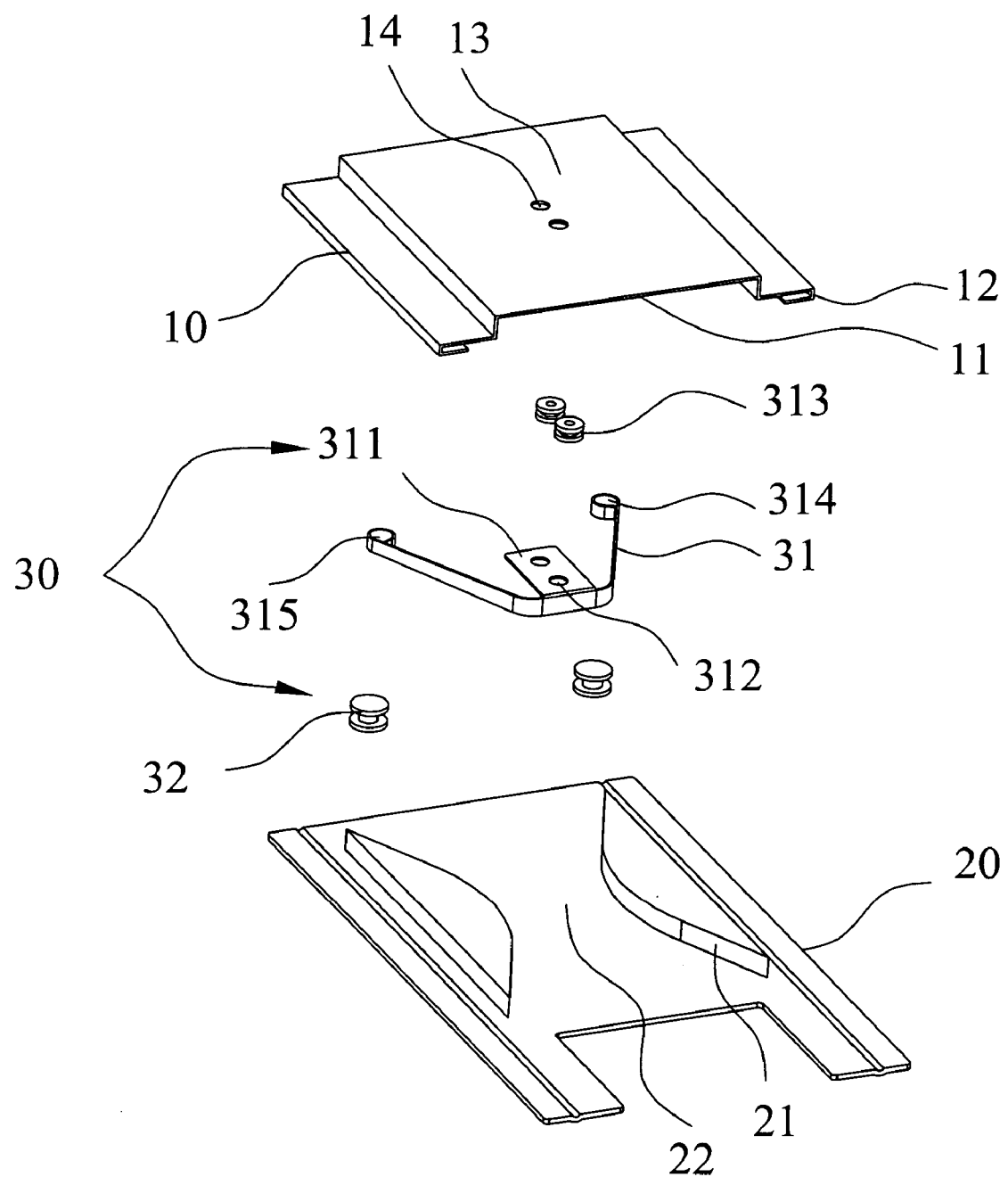
FIG. 2 is an exploded view showing the structure of the first preferred embodiment according to the present invention.

Please refer to FIG. 1 and FIG. 2, the present invention relates to a handset sliding structure comprising a cover 10, a base 20 and a slider 30. The first preferred embodiment is an example for a cellular phone.

In the first preferred embodiment, both the cover 10 and the base 20 are made by sheet metal. The cover 10 comprises two buckles 12 and a concave part 11 between the two buckles 12. The concave part 11 comprises an assembling member 13 with two adjacent rivet holes 14.

The base 20 is adapted to slide between the two buckles 12 deposited at two sides of the cover 10. The two sliding tracks 21 are set on the same surface of the base 20. The two sliding tracks 21 formed a narrow section 22 where the distance between the two sliding tracks at the narrow section 22 is the smallest.

The slider 30 comprises an elastic member 31, and two rollers 32 fixed at two ends 314,315 of the elastic member 31. In this embodiment, the elastic member 31 is a leaf spring disposed at a proper place on the cover 10, and the two rollers 32 at two ends 314,315 of the elastic member 31 are abutted against the continuous curved surfaces of the two sliding tracks 21. The elastic member 31 comprises a rivet part 311 with a plurality of rivet holes 312 corresponding to the rivet holes 14 of the cover 10 to fix the elastic member 31 on the cover 10 by rivets 313. Therefore, the elastic member 31 is fixed in the concave part 11 of the cover 10, and two rollers 32 disposed at two ends 314,315 of the elastic member 31 are abutted against the respectively opposing surfaces of the two sliding tracks 21.

Figure 3:
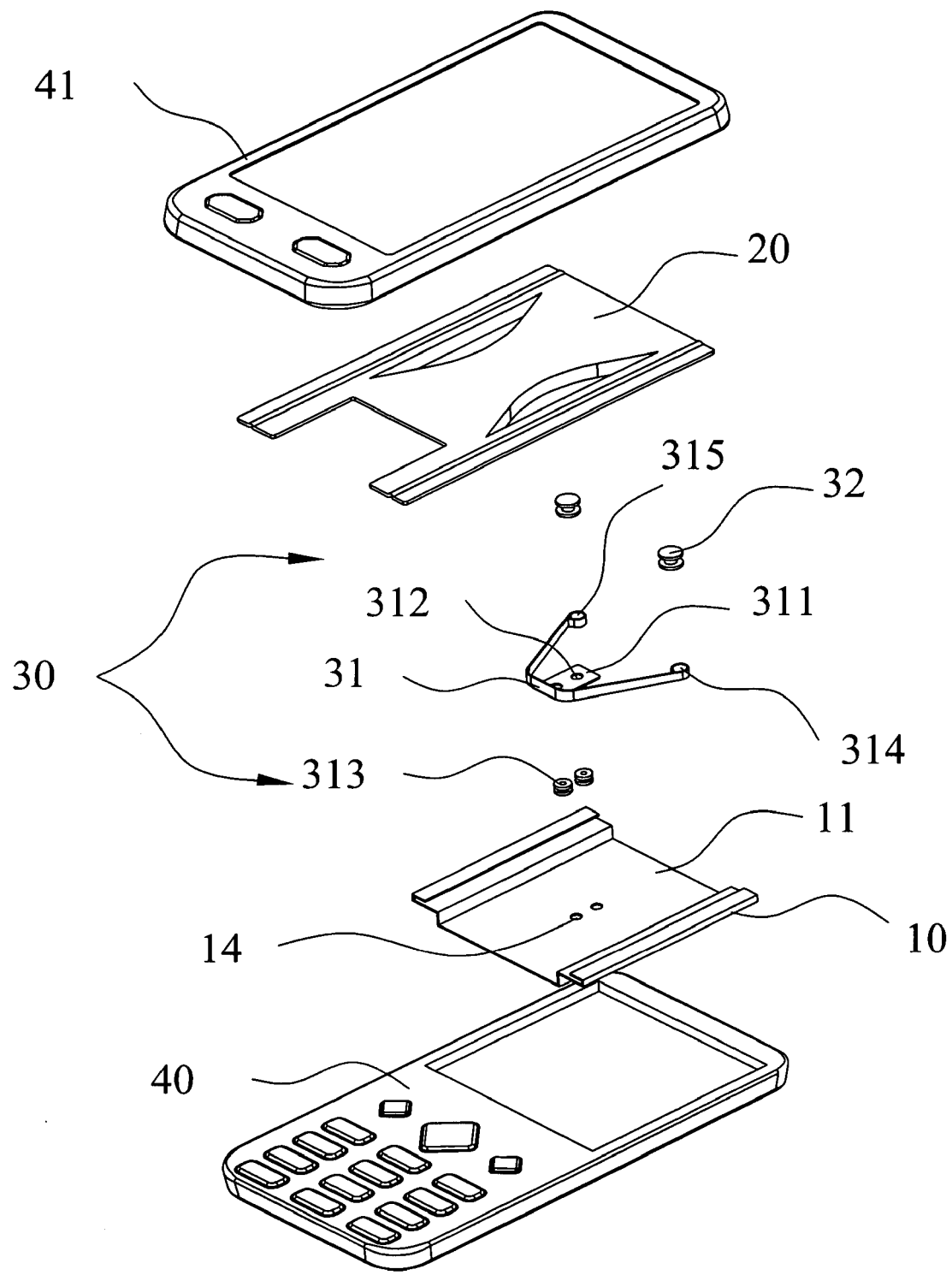
FIG. 3 is a view showing a status of use of the first preferred embodiment according to the present invention.
Figure 4A:
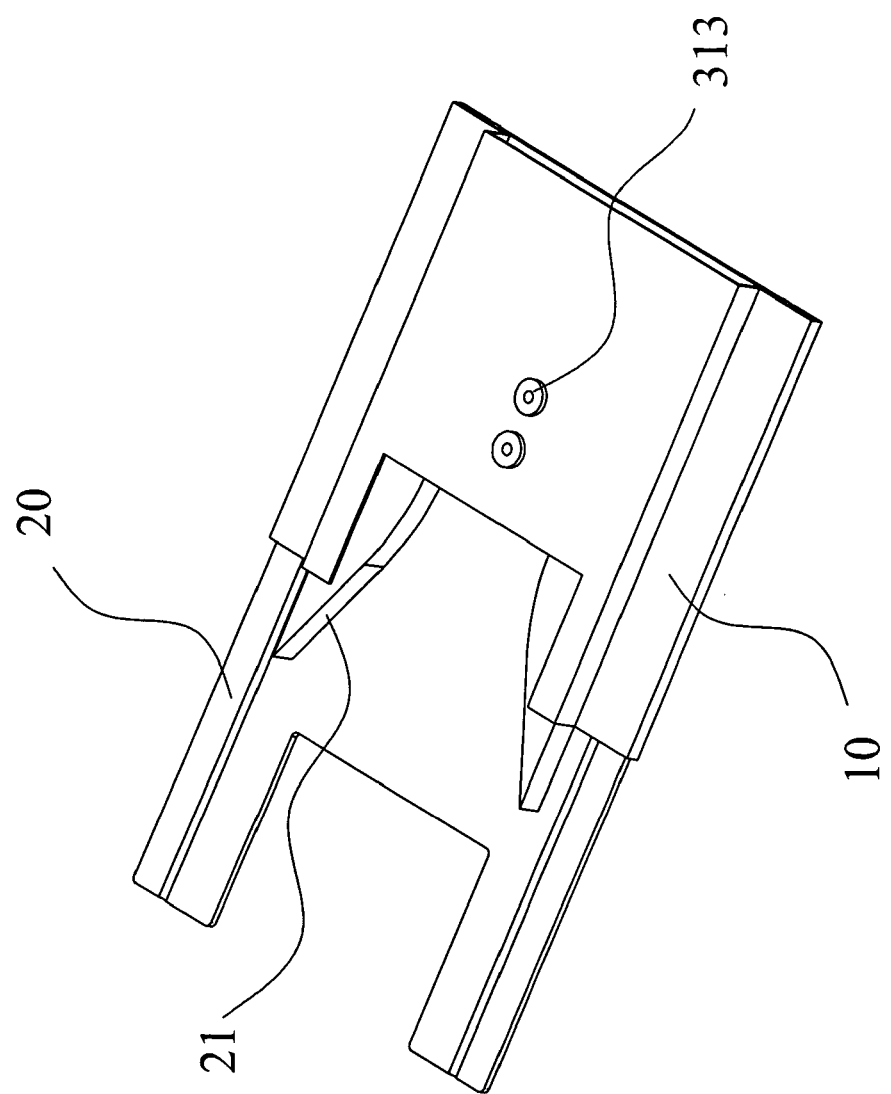
FIG. 4A and FIG. 4B are views showing the cover of the first preferred embodiment located at a predestined position according to the present invention.
Figure 4B:
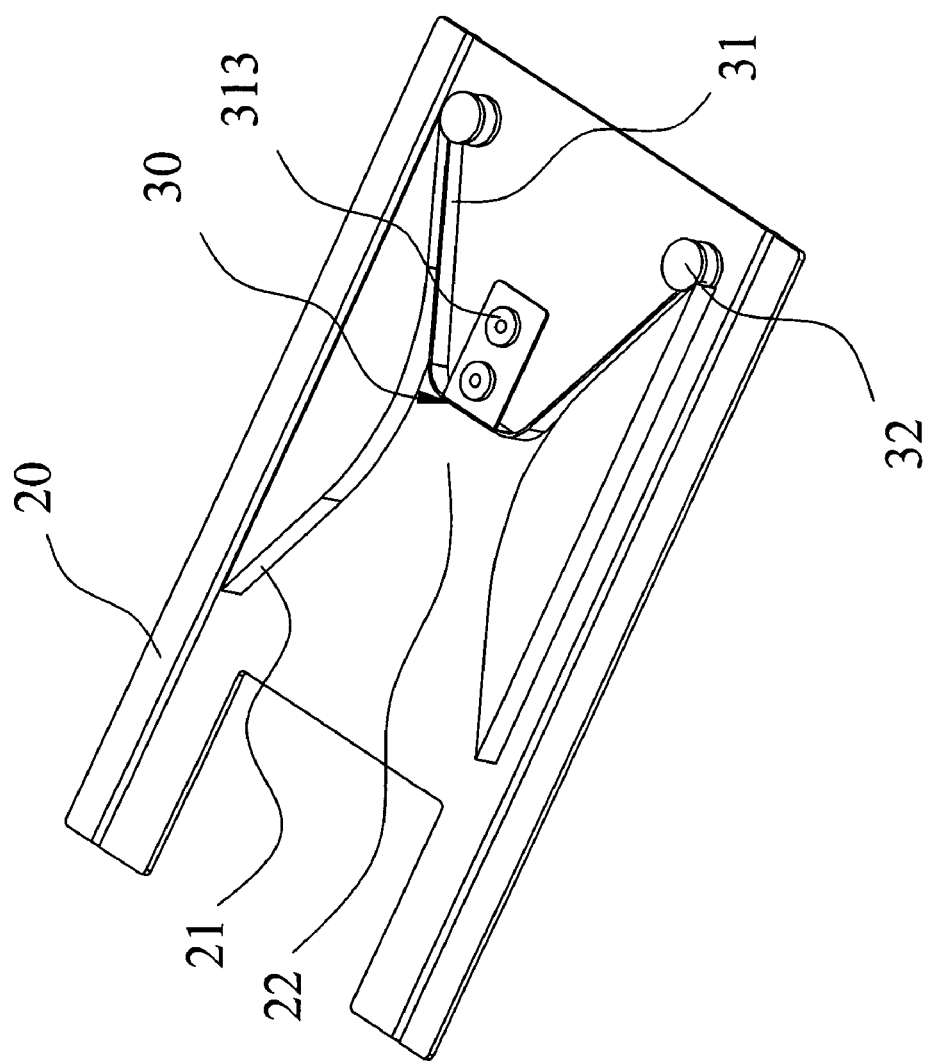

Please refer to FIG. 3 through FIG. 6B, in assembling, the cover 10 is disposed on the main body 40 of the handset and the base 20 is disposed on the sub body 41 of the handset, as shown in FIG. 3. End users can push the main body 40 to slide the cover 10 on the base 20 by the buckles 12 hooking the base 20 at two sides of the cover 10, in this embodiment.

Figure 5A:
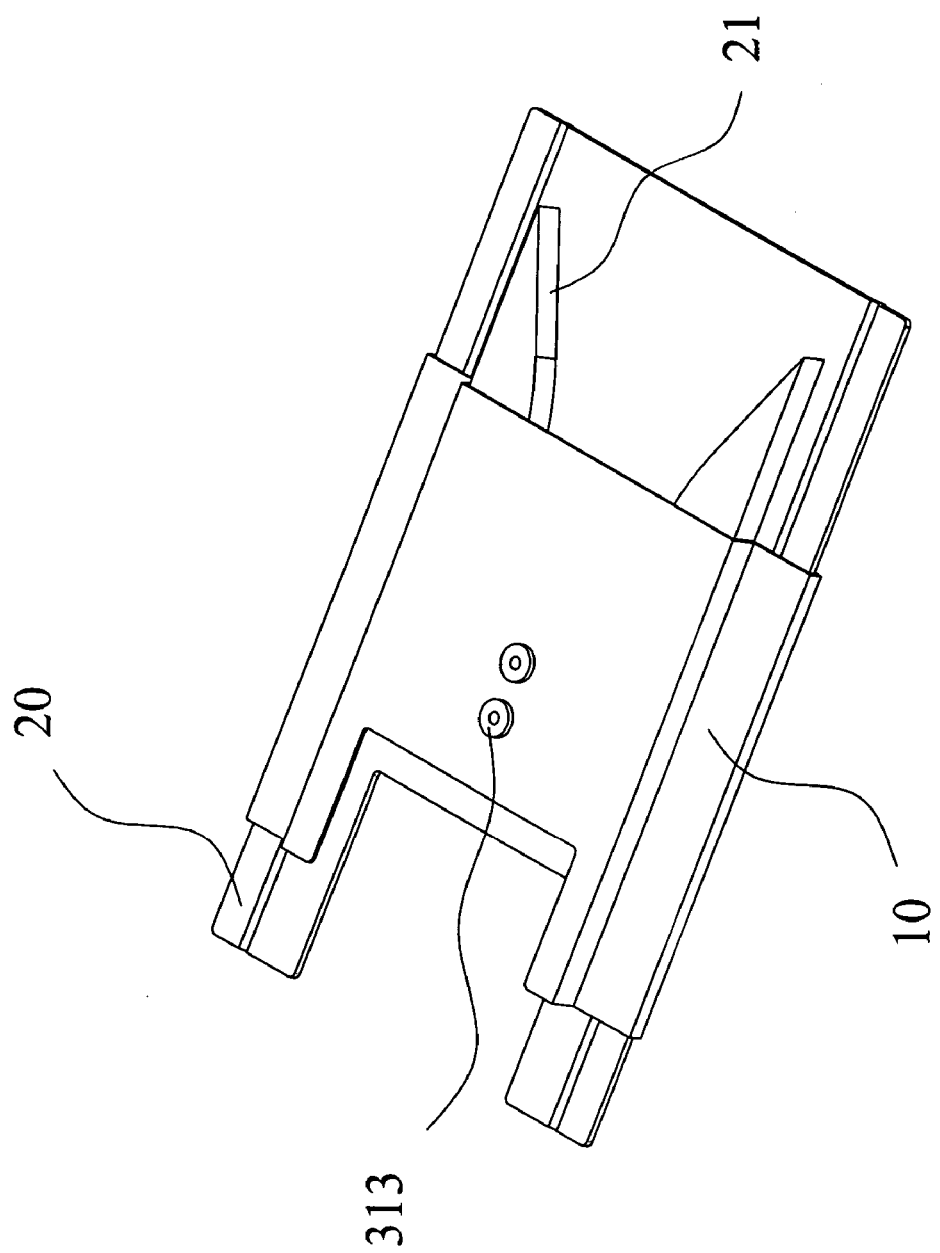
FIG. 5A and FIG. 5B are views showing the cover of the first preferred embodiment moved to a position where the elastic member is squeezed most according to the present invention.
Figure 5B:
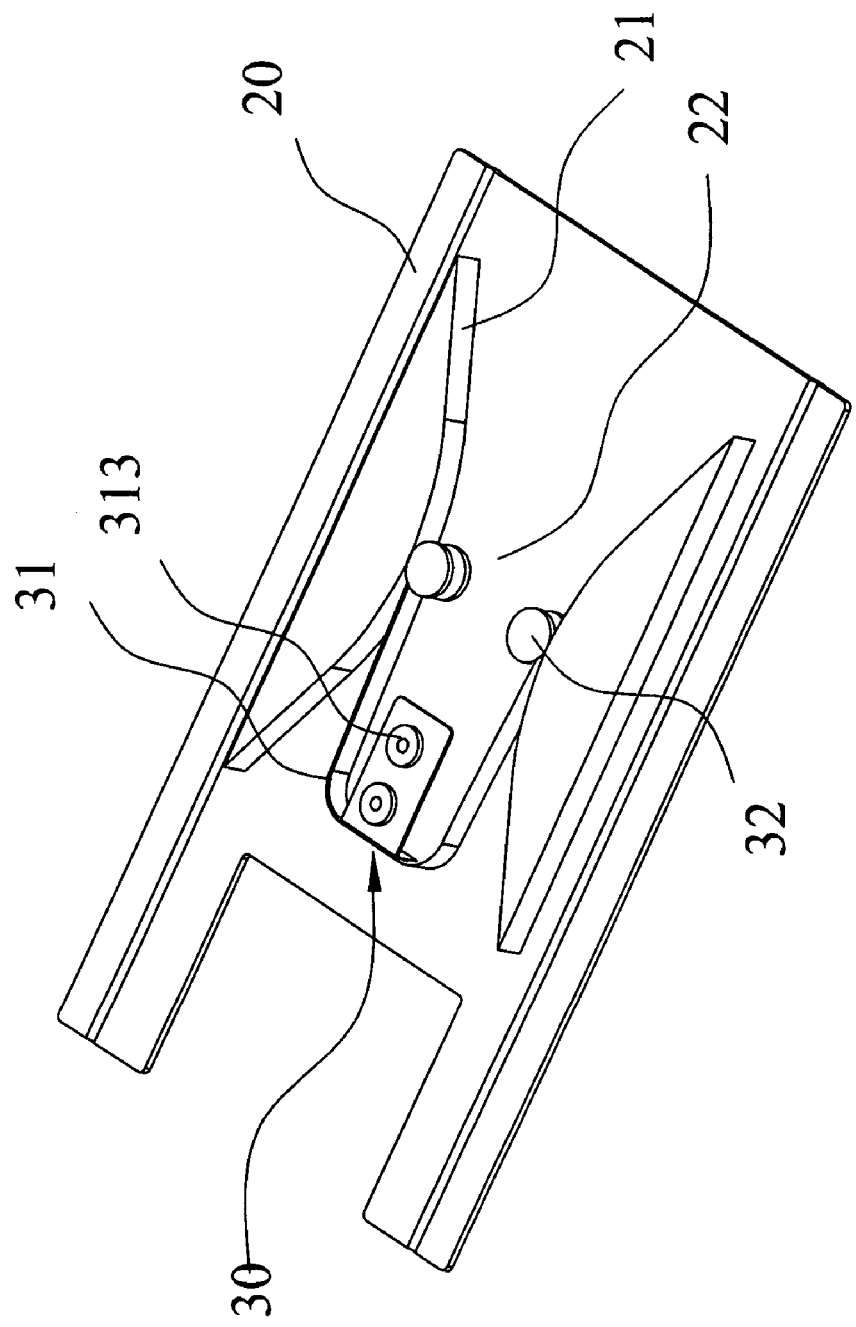
Figure 6A:
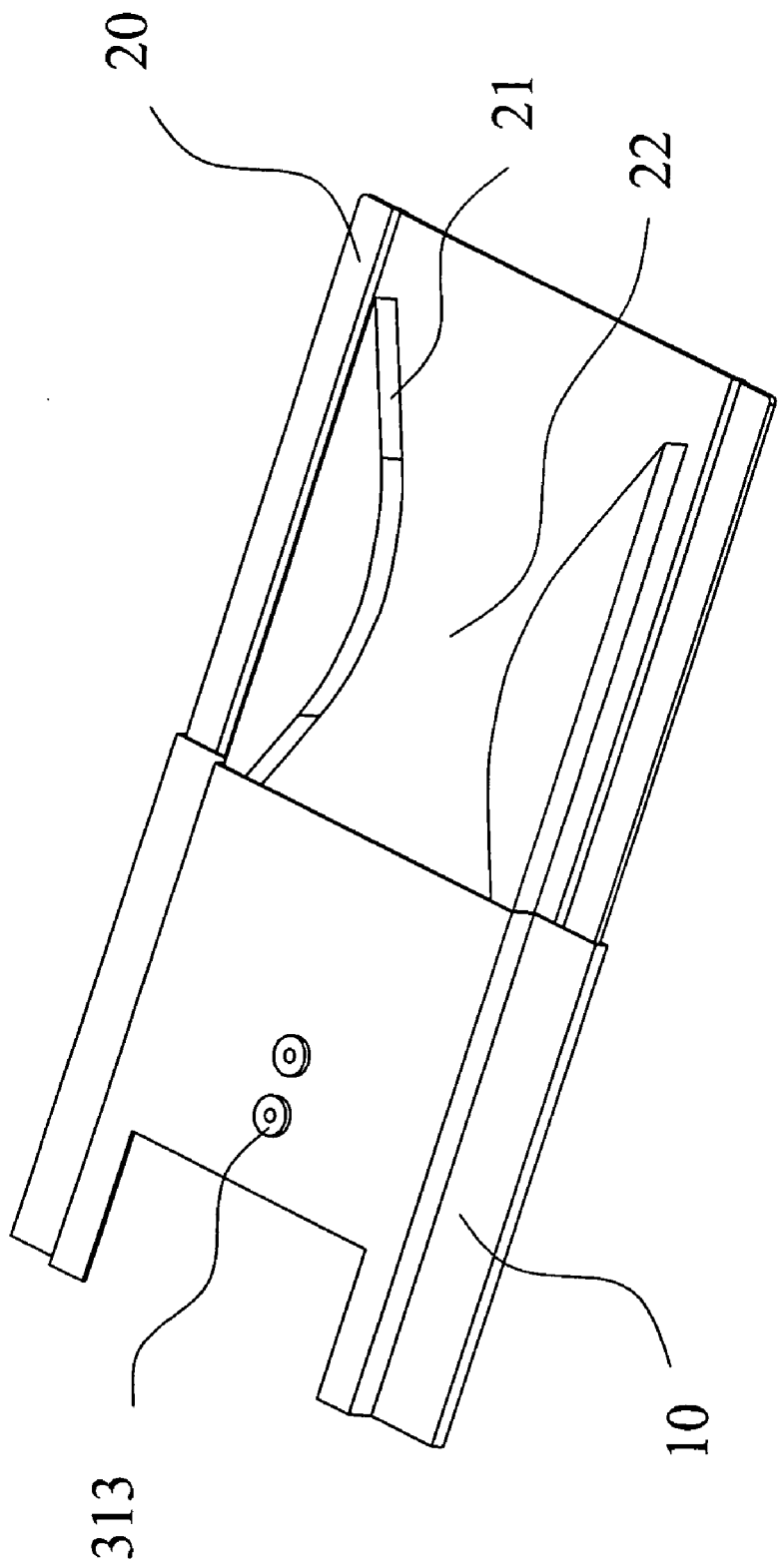
FIG. 6A and FIG. 6B are views showing the cover of the first preferred embodiment opened to another predestined position according to the present invention.
Figure 6B:
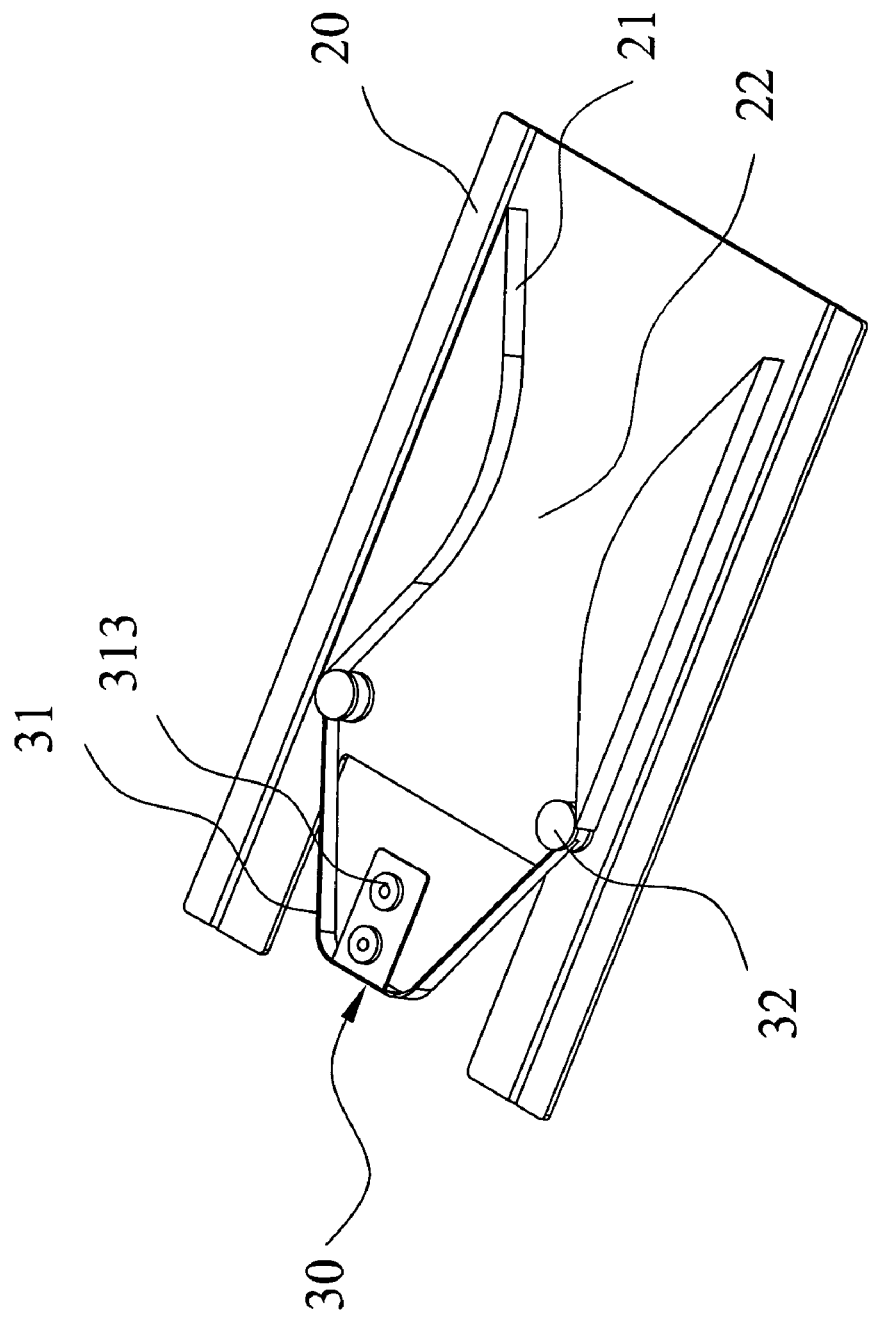

When the cover 10 is moved by an external force, applied by end users, the elastic member 31 fixed on the assembling part 13 is driven by the cover 10 to make the rollers 32 disposed at two distal ends 314,315 move along the two sliding tracks 21. During the rollers 32 moving along the continuous surfaces of the two sliding tracks 21 toward the narrow section 22, the elastic member 31 is being compressed by the two distal ends 314, 315 of the elastic member 31. When the rollers 32 move across the narrow section 22 of the sliding tracks 21, where the elastic member 31 is compressed most, as shown in FIG. 5B, the energy stored in the elastic member begins to be released. Since the energy released by the elastic member 31 makes the two rollers 32, disposed at the two distal ends 314,315 of the elastic member 31 to push the sliding tracks 21, the elastic member 31 slides between the sliding tracks 21 by the rollers 32 automatically although the external force applied by the end user would be removed at that time. Then, the cover 10 can automatically slide to one of the predestined positions, the opening end or the closing end, as shown in FIG. 6B, for opening or closing the handset. Besides, in order to ensure the sliding of the elastic member 31 harmonically, the surfaces of the two sliding tracks 21 should better be continuous curved surfaces.

In the first embodiment, in order to gain enough energy for ensuring the cover 10 shall remain at the predestined opening or closing position, except another external force applied to the cover, after the elastic member 31 is being slid through the narrow section 22 of the two sliding tracks 21, the techniques disclosed in the first preferred embodiment can be simply modified, for example, but not limited to, by shortening the distance between the two sliding tracks for increasing the elasticity of the elastic member 31, and/or by folding the elastic member 31 times to become a wider elastic member 31 to increase the elasticity of the elastic member 31.

Figure 7:
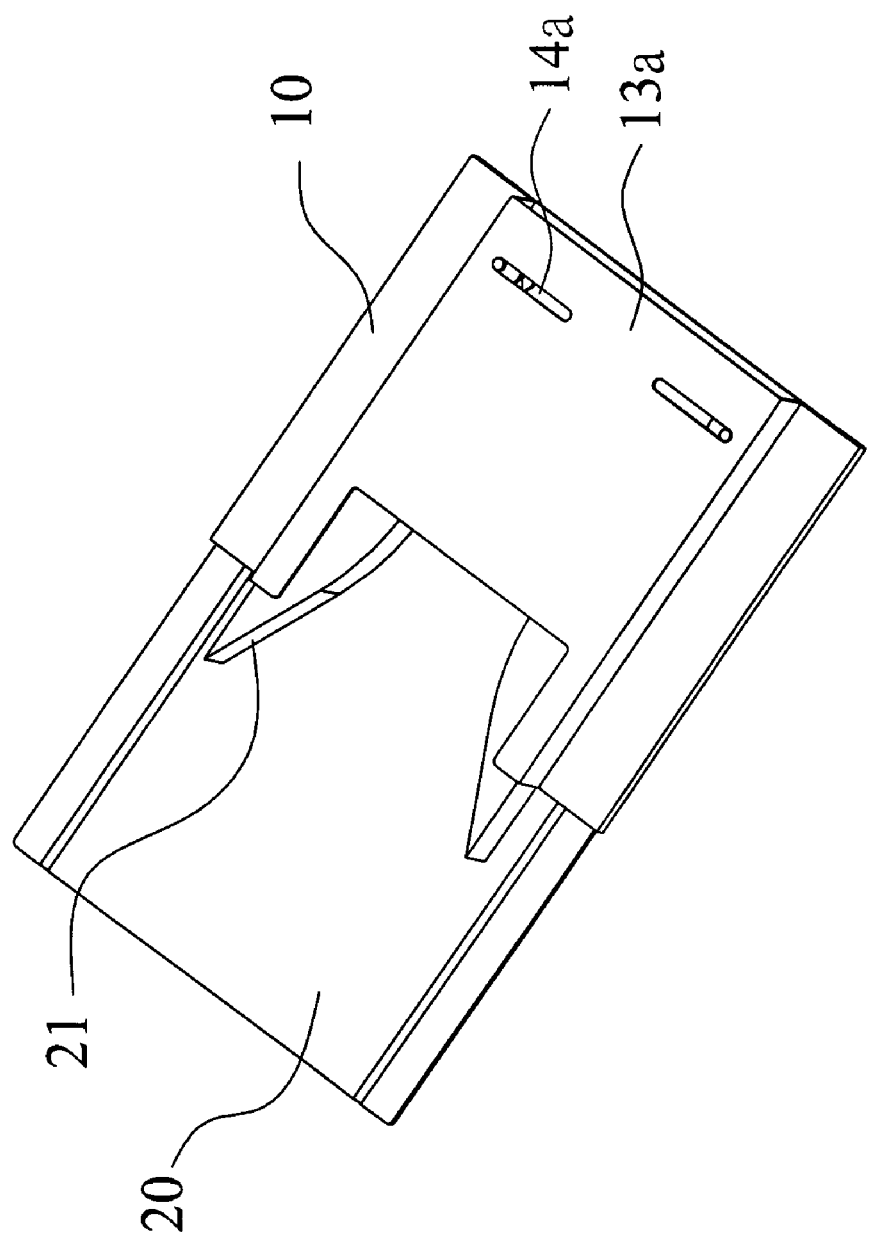
FIG. 7 is a perspective view of the second preferred embodiment according to the present invention.
Figure 8:
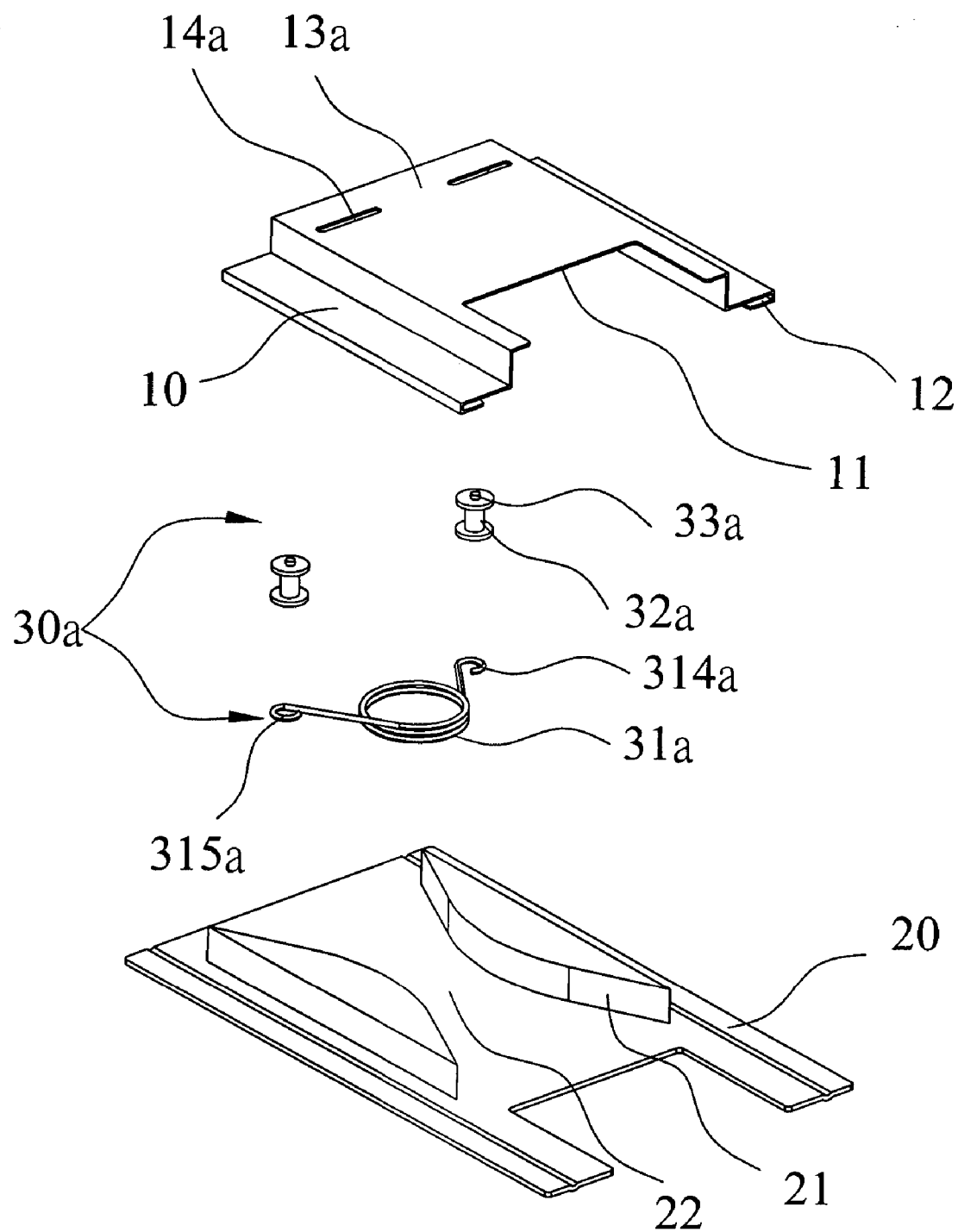
FIG. 8 is an exploded view showing the structure of the second preferred embodiment according to the present invention.

Please refer to FIG. 7 and FIG. 8, the second preferred embodiment of present invention is a handset sliding structure, comprising a cover 10, a base 20 and a slider 30. The second preferred embodiment is fabricated within a handset to slide the cover of the handset to predestined positions, opening and closing ends.

In the second preferred embodiment, the cover 10 comprises a concave part 11 with two buckles 12 at each of two opposite sides of the cover 10, and the concave part 11 comprises an assembling member 13 with two adjacent wide holes 14.

The base 20 is slidable according to the two buckles 12 formed at two opposite sides of the cover 10. Each of the two sliding tracks 21 has a continuous curved surface and the two sliding tracks 21 form a narrow section 22 where the distance between the two sliding tracks is relatively shorter.

The slider 30a is disposed in the concave part 11 of the cover 10, and comprises an elastic member 31a, a torsion spring, and two rollers 32a fixed at two distal ends 314a, 315a of the elastic member 31a. Each of the two rollers 32a, disposed at two distal ends 314a,315a of the elastic member, 31a having a jut 33 at the axis protruding out, abuts against the curved surfaces of one of the two sliding tracks 21. The juts 33 of the two rollers 32a are fitted in the wide holes 14 of the concave part 11 of the cover 10. The juts 33 are moveable in the two wide holes 14a of the assembling part 13a.

Figure 9:
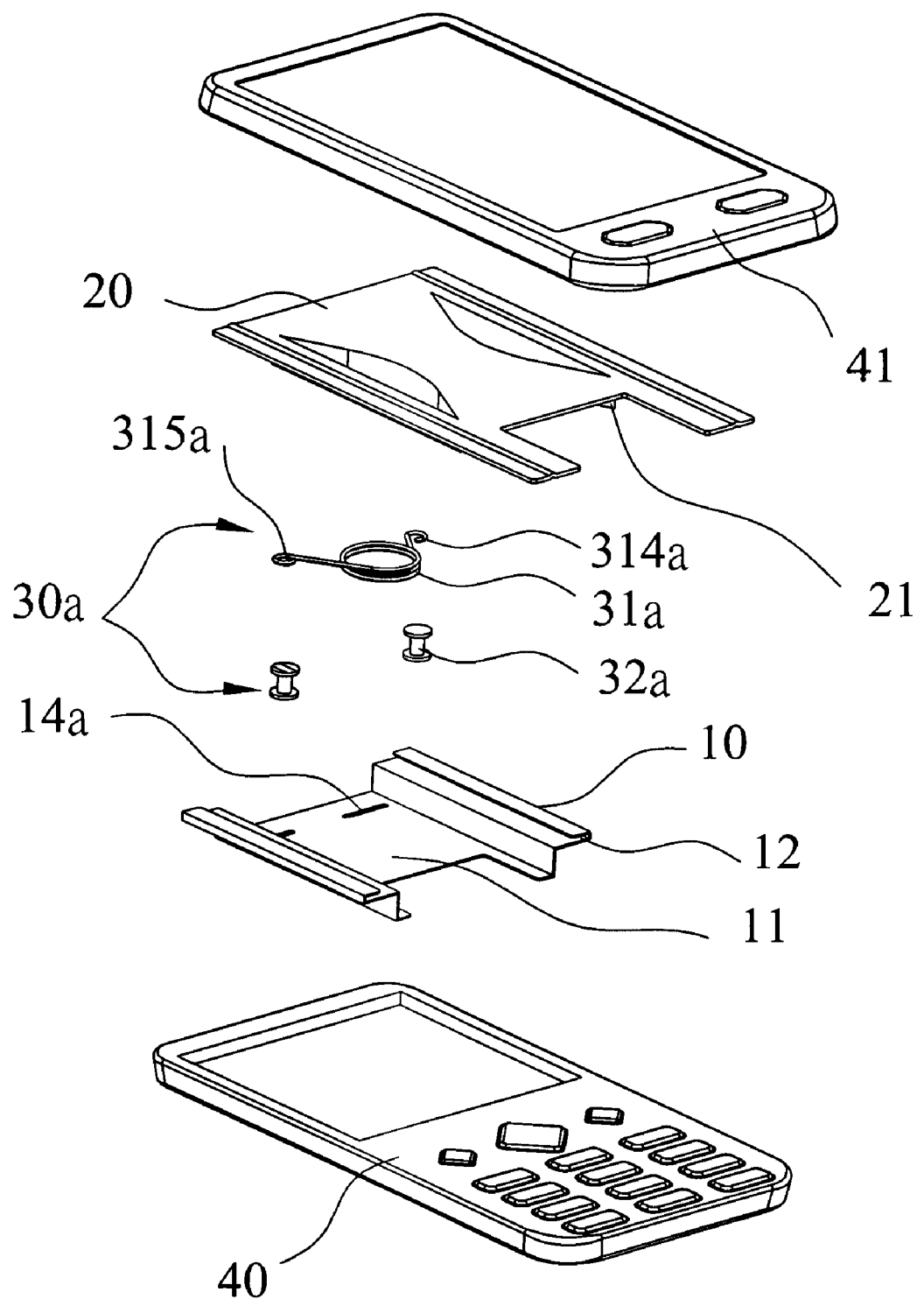
FIG. 9 is a view showing a status of use of the second preferred embodiment according to the present invention.
Figure 10A:
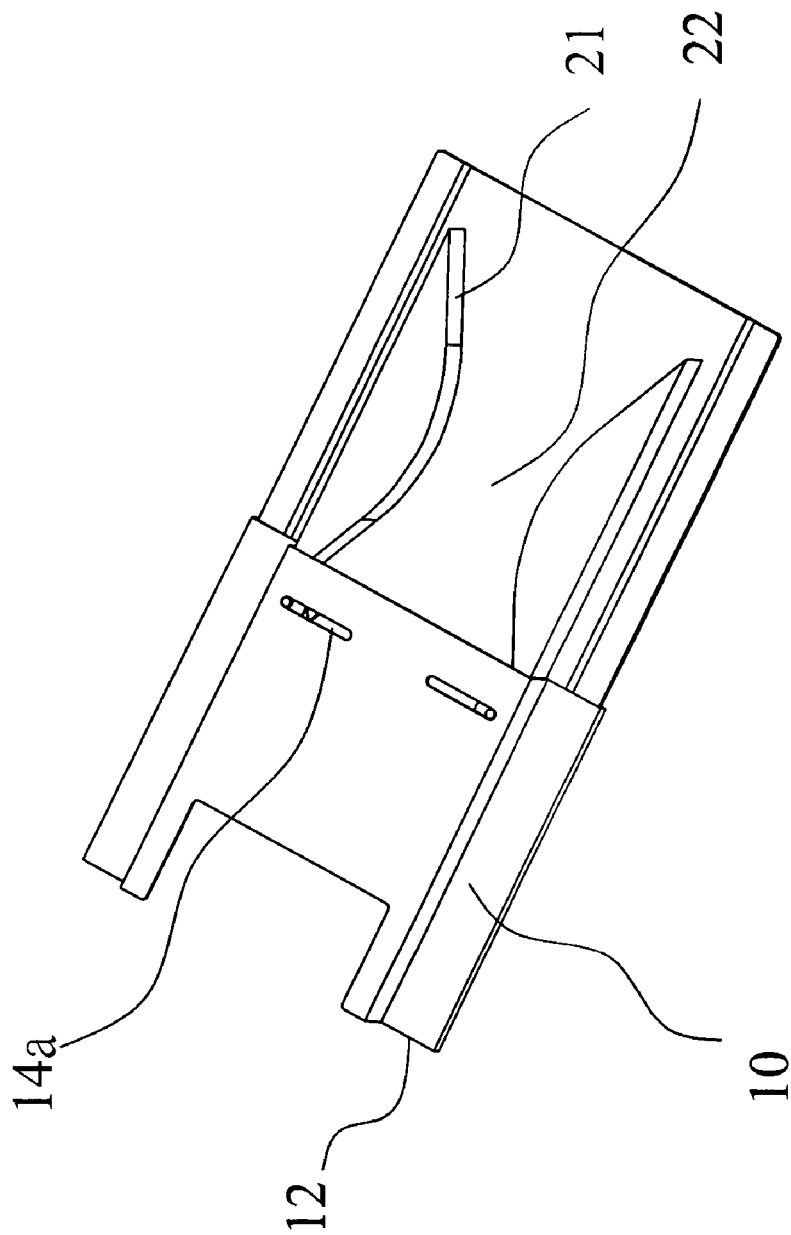
FIG. 10A and FIG. 10B are views showing the cover of the second preferred embodiment located at a predestined position according to the present invention.
Figure 10B:
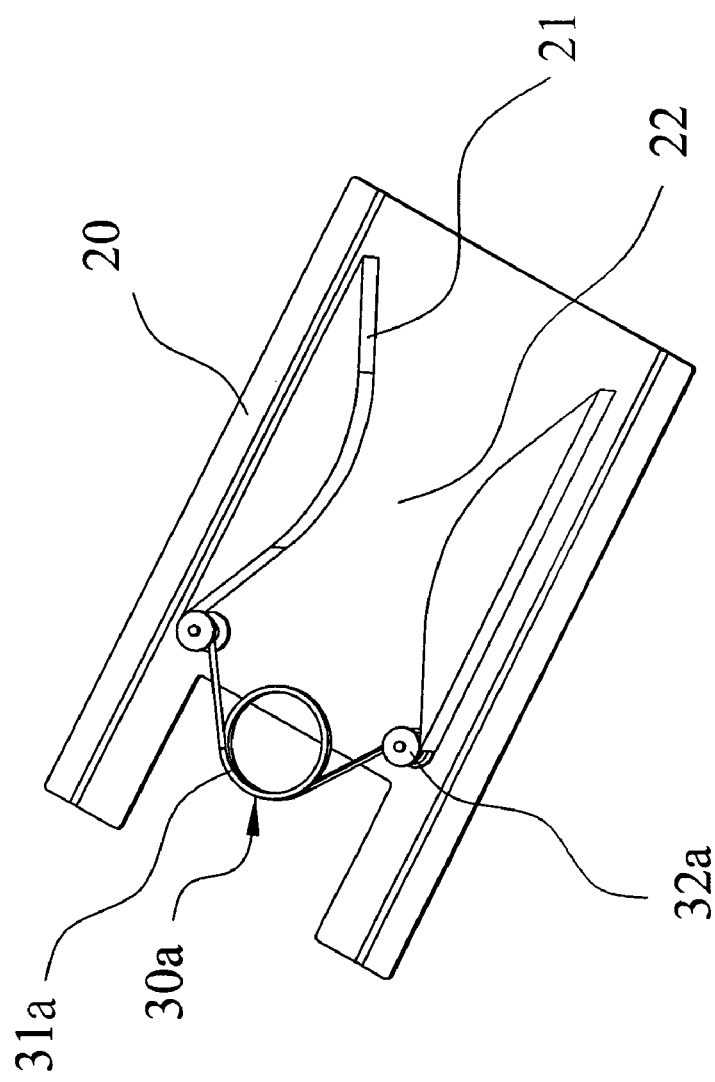

Please refer to FIG. 9 through FIG. 12B, during assembling the second preferred embodiment according to the present invention, the cover 10 is deposed on the main body 40 of the handset and the base 20 is deposited on the sub body 41 of the handset, as shown in FIG. 9.

Figure 11A:
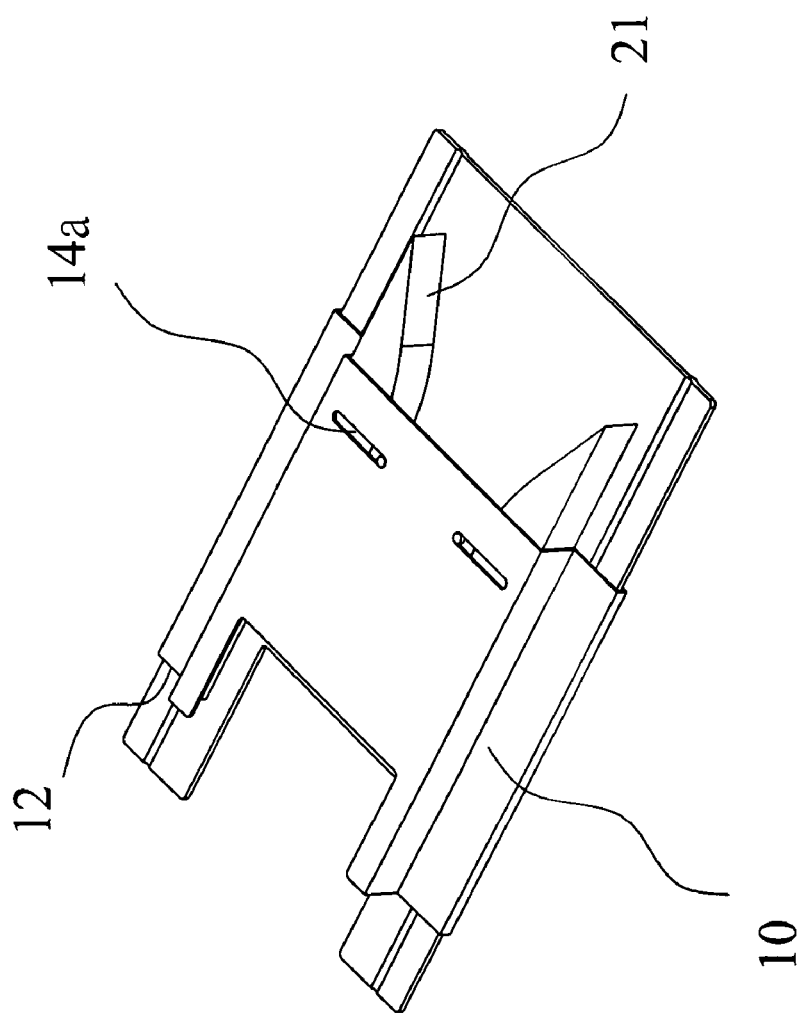
FIG. 11A and FIG. 11B are views showing the cover of the second preferred embodiment moved to a position where the elastic member is squeezed most according to the present invention.
Figure 11B:
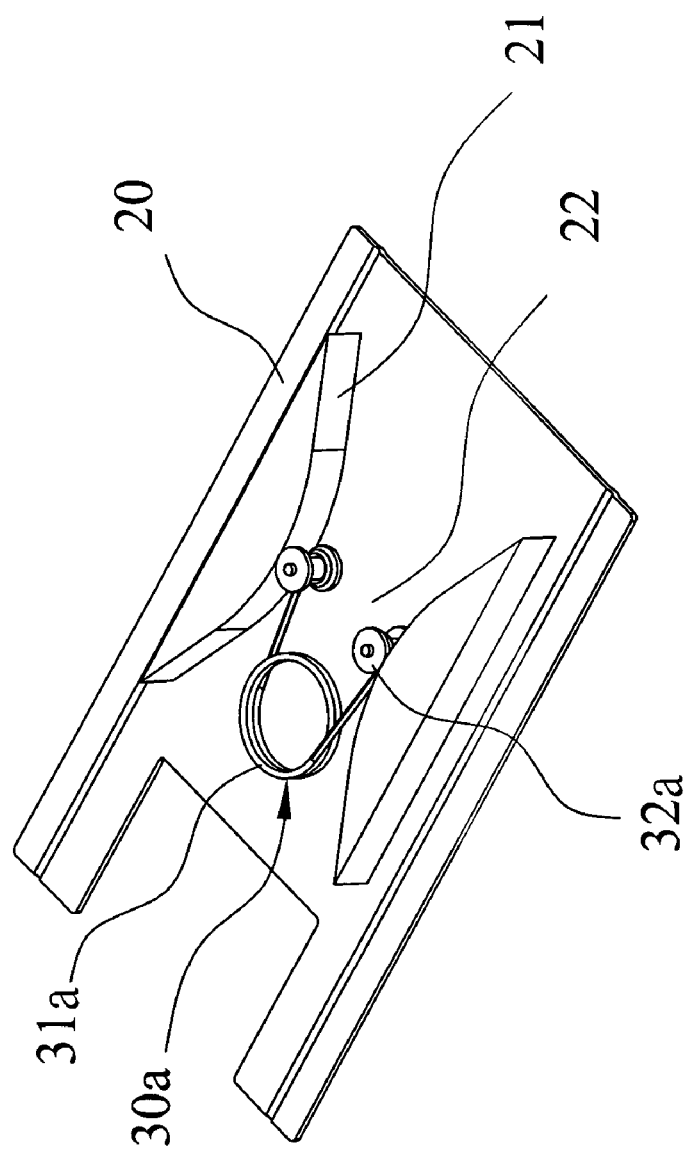
Figure 12A:
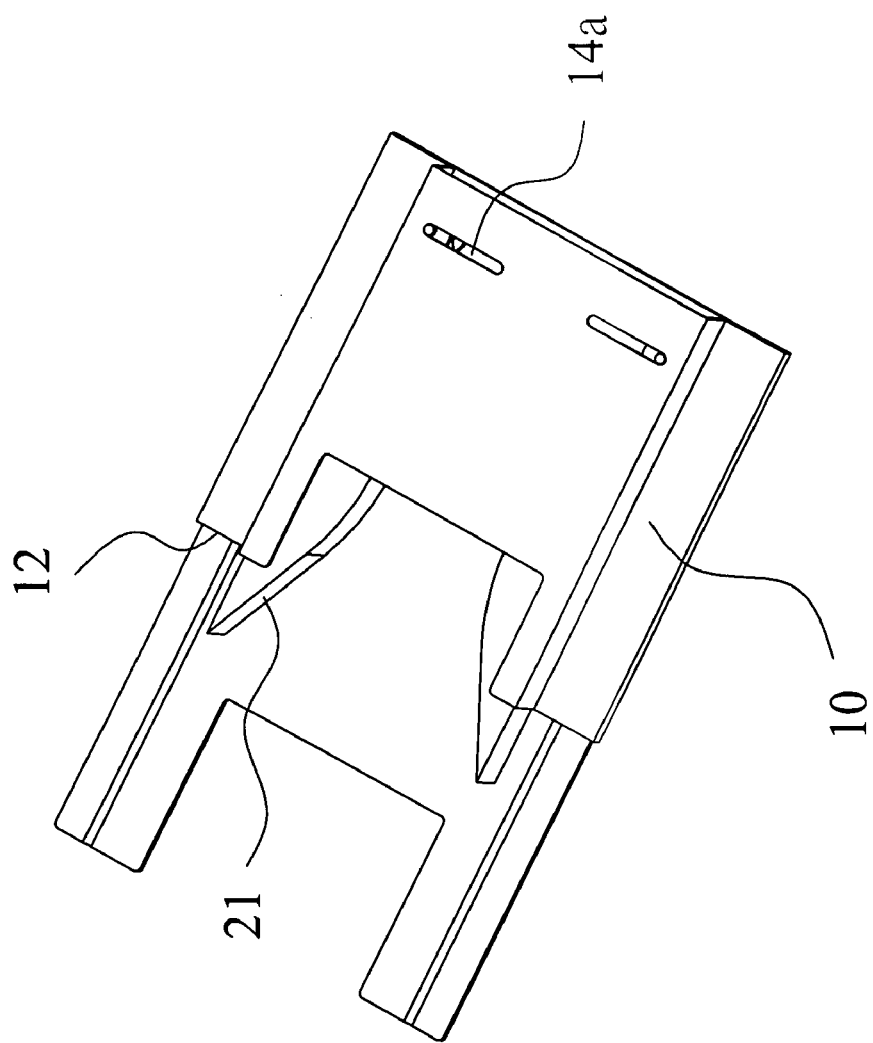
FIG. 12A and FIG. 12B are views showing the cover of the second preferred embodiment opened to another predestined position according to the present invention.
Figure 12B:
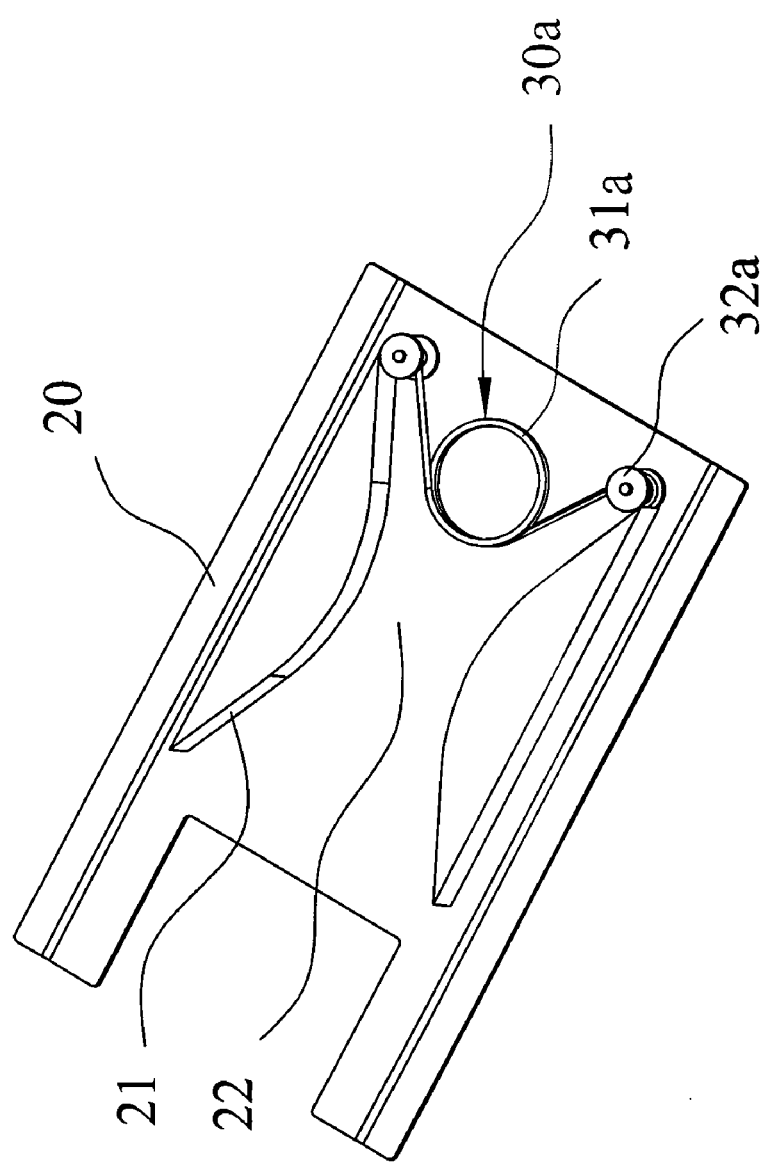
Figure 13:
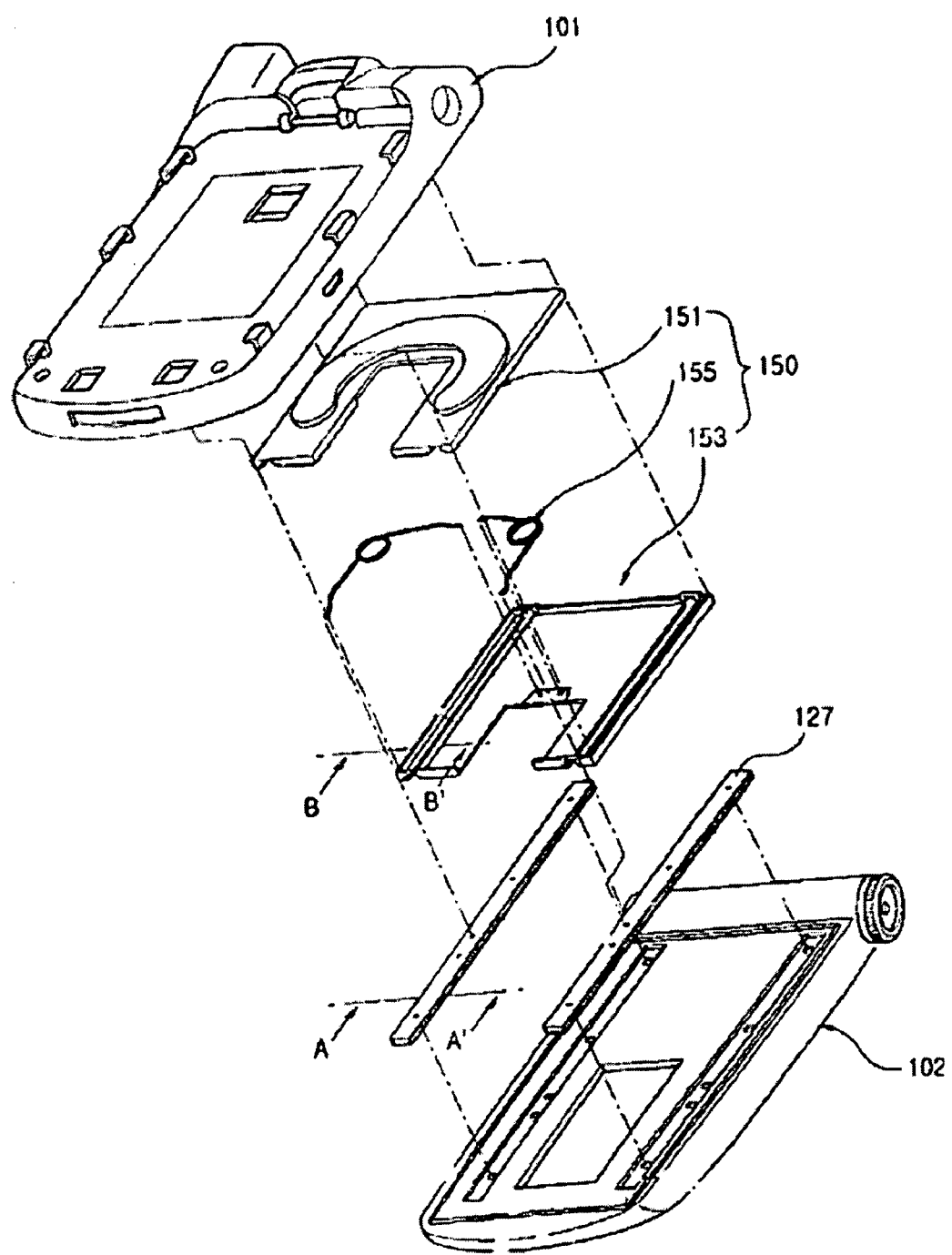
FIG. 13 is a view showing a status of use according to the prior art.

When a user pushes the main body 40, or the sub body 41, the cover 10 slides on the base 20 by the buckles 12 formed at two opposite sides. At the time, the cover 10 drives the slider 30a to move and the rollers 32a rise and fall for the sliding tracks 21. The juts 33 of the rollers 32a move in the wide holes 14a respectively, as shown in the drawings. The two rollers 32a slide along the opposite continuous curved surfaces of the sliding tracks 21 and the elastic member 31a is compressed when the rollers 32a moves toward the narrow section 22 the two sliding tracks 21. When the rollers 32a move through the narrow section 22 where the elastic member 31a is compressed most, as shown in FIG. 11A, the energy stored in the elastic member 31a is the maximum. After the two rollers 32a pass through the narrow section 22, the elastic member 31a starts to restore the energy stored in the elastic member 31a while pushing the cover 10 to the predestined position, as shown in FIG. 12A for opening or closing the main body 40 of the handset.

In the second preferred embodiment according to the present invention, the elastic member 31a slides between the opposite continuous curved surfaces toward the narrow section 22 between the two sliding tracks 21 when the elastic member 31a is compressed, and the juts 33 of the rollers 32a move in the wide holes 14a of the cover 10, where the way that the cover 10 drives the sliders 30a or reversed is different from the first embodiment. Because the relationships between the slider 30a and the cover 10 of the first and second preferred embodiments are the similar, the movements between the above two preferred embodiments disclosed are substantially the same.

In the above two preferred embodiments according to the present invention, the rollers are disposed at the distal ends of the elastic member and abut against to the continuous curved surfaces of the sliding tracks on the base so that the friction at contact surfaces, between the rollers of the elastic member and curved surfaces of the sliding tracks are significantly reduced. In order to simplify the assembling, the two rollers of the elastic member can simply be omitted.

According to what is disclosed above, the present invention is to disclose a novel sliding structure that can push the cover of the handset to be relatively slid to a predestined position. The buckles of the cover for buckling two opposite sides of the base in the above two embodiments according to the present invention are the same, but they are examples only, not intend to limit the applications of this invention. One who is skilled in the art would use the sliding structure disclosed above with some other buckles differed from the above two.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. A handset sliding structure having a main body and a sub body slidable in a predetermined distance to said main body, comprising a cover and a base held on said main body and said sub body respectively, characterized in that the base has two opposing sliding tracks forming a narrow section in the shortest distance between said two sliding tracks; and a slider comprises an elastic member disposed on said cover and extending two resilient distal ends, wherein the two resilient distal ends abutting on the opposing surfaces of said two sliding tracks.

2. The handset sliding structure according to claim 1, wherein said elastic member further comprises two rollers disposed at said two resilient distal ends to abut on said opposing surface of said two sliding tracks.

3. The handset sliding structure according to claim 2, wherein each of said two rollers extends a jut from the axis.

4. The handset sliding structure according to claim 1, wherein said cover comprises two wide holes for said two juts fitted therein; and wherein said two juts slide in said wide holes.

5. The handset sliding structure according to claim 1, wherein said elastic member is a leaf spring.

6. The handset sliding structure according to claim 5, wherein said leaf spring is continuously folded to increase the thickness of said leaf spring.

7. The handset sliding structure according to claim 1, wherein said elastic member is a torsion spring.

8. The handset sliding structure according to claim 1, wherein said two sliding tracks have a continuous curved surface for each said sliding tracks.

* * * * *